United States Patent
Xu et al.

(10) Patent No.: US 12,260,201 B2
(45) Date of Patent: Mar. 25, 2025

(54) APPLICATION DEPLOYMENT METHOD, APPLICATION BLUEPRINT GENERATION METHOD, PLATFORM, TERMINAL AND MEDIUM

(71) Applicant: ZTE CORPORATION, Guangdong (CN)

(72) Inventors: Zhanwei Xu, Guangdong (CN); Guangxu Li, Guangdong (CN); Xiaowu Zhong, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 69 days.

(21) Appl. No.: 18/009,374

(22) PCT Filed: Mar. 30, 2021

(86) PCT No.: PCT/CN2021/083872
§ 371 (c)(1),
(2) Date: Dec. 9, 2022

(87) PCT Pub. No.: WO2021/253914
PCT Pub. Date: Dec. 23, 2021

(65) Prior Publication Data
US 2023/0221934 A1    Jul. 13, 2023

(30) Foreign Application Priority Data
Jun. 19, 2020  (CN) .......................... 202010567511.7

(51) Int. Cl.
*G06F 8/60* (2018.01)
*G06F 9/50* (2006.01)

(52) U.S. Cl.
CPC .............. *G06F 8/60* (2013.01); *G06F 9/5038* (2013.01)

(58) Field of Classification Search
None
See application file for complete search history.

(56) References Cited

U.S. PATENT DOCUMENTS

| 8,266,254 B2 * | 9/2012 | Garrison | ............... G06F 9/5061 709/220 |
| 10,908,938 B2 * | 2/2021 | Palavalli | ............. G06F 9/45558 |

(Continued)

FOREIGN PATENT DOCUMENTS

| CN | 102821000 A | 12/2012 |
| CN | 104871131 A | 8/2015 |

(Continued)

OTHER PUBLICATIONS

WIPO, International Search Report issued on Jun. 11, 2021.

(Continued)

*Primary Examiner* — Ryan D. Coyer
(74) *Attorney, Agent, or Firm* — Li & Cai Intellectual Property (USA) Office

(57) ABSTRACT

Provided is an application deployment method, including: receiving an application blueprint (S1) including at least two different sub-blueprints; and deploying an application instance on a hardware device in a cluster according to the application blueprint and external capabilities provided by all deployed application instances (S2), with a sum of the external capabilities provided by all the deployed application instances being greater than or equal to the total external capability of the application. The present disclosure further provides an application blueprint generation method, a microservice platform, a communication terminal and a computer-readable medium.

20 Claims, 9 Drawing Sheets

(56) References Cited

U.S. PATENT DOCUMENTS

| | | | | |
|---|---|---|---|---|
| 2007/0240162 | A1* | 10/2007 | Coleman | G06F 11/008 718/104 |
| 2008/0306798 | A1* | 12/2008 | Anke | G06F 8/61 705/7.26 |
| 2013/0232470 | A1* | 9/2013 | Yung | G06F 8/40 717/121 |
| 2014/0201218 | A1* | 7/2014 | Catalano | H04L 47/803 707/748 |
| 2015/0378702 | A1* | 12/2015 | Govindaraju | G06F 8/60 717/177 |
| 2015/0378703 | A1* | 12/2015 | Govindaraju | G06F 8/20 717/174 |
| 2016/0139906 | A1* | 5/2016 | Govindaraju | G06F 8/61 717/175 |
| 2017/0139695 | A1* | 5/2017 | Govindaraju | G06F 9/50 |
| 2019/0034460 | A1 | 1/2019 | Eberlein | |
| 2020/0218528 | A1* | 7/2020 | Bao | G06F 8/65 |
| 2021/0034359 | A1 | 2/2021 | Lepcha et al. | |

FOREIGN PATENT DOCUMENTS

| | | | |
|---|---|---|---|
| CN | 106897094 | A | 6/2017 |
| CN | 108234589 | A | 6/2018 |
| CN | 110457114 | A | 11/2019 |
| CN | 110895464 | A | 3/2020 |
| JP | 2017529633 | A | 10/2017 |
| JP | 2019530095 | A | 10/2019 |
| WO | WO2014054231 | A1 | 4/2014 |
| WO | WO 2019056187 | A1 | 3/2019 |

OTHER PUBLICATIONS

Japan Patent Office, first Office action dated Nov. 7, 2023, for corresponding JP application No. 2022-577782.

European Patent Office, the Extended European Search Report dated Oct. 5, 2023, for corresponding EP application No. 21826418.2.

European Patent Office, the first Office action dated Oct. 28, 2024, for corresponding EP application No. 21826418.2.

China Patent Office, the first Office action dated Oct. 31, 2024, for corresponding CN application No. 202010567511.7.

* cited by examiner

S2a

```
┌─────────────────────────────────────────────────────────────────┐
│ determine the sub-blueprint with the highest deployment priority │ ─── S201
│ level of the application blueprint as the sub-blueprint to be    │
│ used for deployment                                              │
└─────────────────────────────────────────────────────────────────┘
                              │
                              ▼
            ╱─────────────────────────────────╲
           ╱  determine the maximum number of  ╲
  No      ╱  application instances that are    ╲
◄────────╱ allowed to be deployed according to  ╲──── S202
         ╲ remaining resources of a hardware    ╱
          ╲device of the hardware type         ╱
           ╲corresponding to the sub-blueprint╱
            ╲to be used for deployment, and  ╱
             ╲determine whether a sum of    ╱
              ╲external capabilities       ╱
               ╲provided by deploying the ╱
                ╲maximum number of       ╱
                 ╲application instances ╱
                  ╲is greater than or  ╱
                   ╲equal to a first  ╱
                    ╲capability to   ╱
                     ╲be supplemented╱
                      ╲─────────────╱
                           │ Yes
                           ▼
┌─────────────────────────────────────────────────────────────────┐
│ deploy the application instance on the hardware device of the    │
│ corresponding hardware type according to the sub-blueprint to be │ ─── S203
│ used for deployment in such a way that the sum of the external   │
│ capabilities of the deployed application instances is greater    │
│ than or equal to the first capability to be supplemented         │
└─────────────────────────────────────────────────────────────────┘
                              │
                              ▼
┌─────────────────────────────────────────────────────────────────┐
│ deploy the maximum number of application instances on the        │ ─── S204
│ hardware device of the corresponding hardware type according to  │
│ the sub-blueprint to be used for deployment                      │
└─────────────────────────────────────────────────────────────────┘
                              │
                              ▼
┌─────────────────────────────────────────────────────────────────┐
│ select the sub-blueprint with the deployment priority level      │ ─── S205
│ lower than that of the sub-blueprint to be used for deployment   │
│ by one level as a new sub-blueprint to be used for deployment    │
└─────────────────────────────────────────────────────────────────┘
```

FIG. 3

APPLICATION DEPLOYMENT METHOD, APPLICATION BLUEPRINT GENERATION METHOD, PLATFORM, TERMINAL AND MEDIUM

TECHNICAL FIELD

The present disclosure relates to, but is not limited to, the technical field of communications.

BACKGROUND

With the development of microservices and container technology, a user splits an application into a plurality of microservices when developing large applications, the microservices are orchestrated, scheduled and managed by a corresponding deployment platform, and one configuration file is used for managing the application when the microservices are orchestrated, scheduled and managed. In an edge computing scenario, most devices at an edge side are heterogeneous devices, computing capabilities and storage capabilities of different devices may vary greatly, and structures of Central Processing Units (CPUs) also vary, with the result that configuration parameters of one same application for different hardware types are different.

SUMMARY

In the first aspect, an embodiment of the present disclosure provides an application deployment method, including: receiving an application blueprint including at least two different sub-blueprints, each of which records a corresponding hardware type, an external capability provided by deploying one application instance on a hardware device of the hardware type and a total external capability of an application; and deploying an application instance on a hardware device in a cluster according to the sub-blueprints, with a sum of external capabilities provided by all deployed application instances being greater than or equal to the total external capability of the application.

In the second aspect, an embodiment of the present disclosure further provides an application blueprint generation method, including: acquiring hardware types supported by an application, an external capability provided by deploying one application instance on a hardware device of each hardware type, and a total external capability of the application, and generating sub-blueprints in one-to-one correspondence with the hardware types; combining all the sub-blueprints to generate an application blueprint; and sending the application blueprint to a microservice platform for the microservice platform to deploy application instances on hardware devices in a cluster according to the sub-blueprints.

In the third aspect, an embodiment of the present disclosure further provides a microservice platform, including: one or more processors; and a storage device configured to store one or more programs. When executed by the one or more processors, the one or more programs cause the one or more processors to carry out the application deployment method described herein.

In the fourth aspect, an embodiment of the present disclosure further provides a computer-readable medium having a computer program stored thereon. When the program is executed by a processor, the operations of the application deployment method described herein are performed.

In the fifth aspect, an embodiment of the present disclosure further provides a communication terminal, including: one or more processors; and a storage device configured to store one or more programs. When executed by the one or more processors, the one or more programs cause the one or more processors to carry out the application blueprint generation method described herein.

In the sixth aspect, an embodiment of the present disclosure further provides a computer-readable medium having a computer program stored thereon. When the program is executed by a processor, the operations of the application blueprint generation method described herein are performed.

BRIEF DESCRIPTION OF DRAWINGS

FIG. 3 is a flowchart illustrating an exemplary implementation of the operation S2a according to an embodiment of the present disclosure;

DETAIL DESCRIPTION OF EMBODIMENTS

Figure 1:
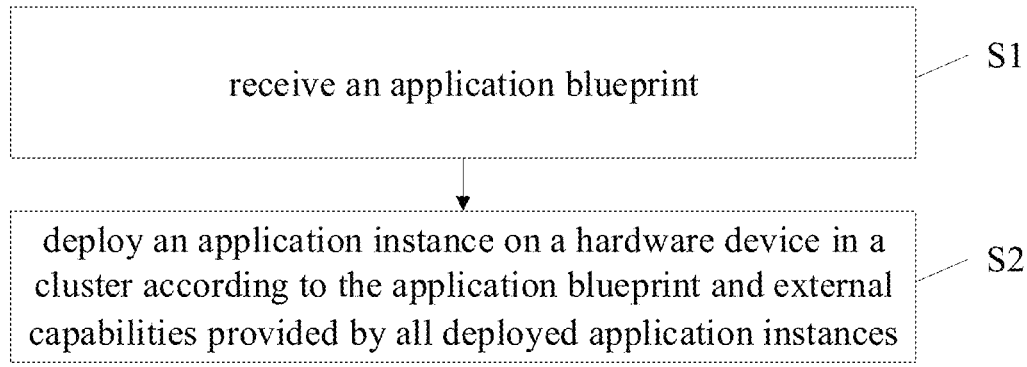
FIG. 1 is a flowchart illustrating an application deployment method according to an embodiment of the present disclosure.

In order to enable those of ordinary skill in the art to better understand the technical solutions of the present disclosure, the application deployment method, the application blueprint generation method, the microservice platform, the communication terminal and the computer-readable media provided by the present disclosure are described in detail below with reference to the drawings.

Exemplary embodiments will be described more fully below with reference to the drawings, but the exemplary embodiments illustrated may be embodied in different forms, and should not be interpreted as being limited to the embodiments described herein. Rather, the embodiments are provided to make the present disclosure thorough and complete, and are intended to enable those of ordinary skill in the art to fully understand the scope of the present disclosure.

The terms used herein are merely used to describe specific embodiments, and are not intended to limit the present disclosure. The terms "one" and "the" used herein which indicate a singular form are intended to include a plural form, unless expressly stated in the context. It should be further understood that the terms "comprise" and "be made of" used herein indicate the presence of the described features, integers, operations, elements and/or components, but do not exclude the presence or addition of one or more other features, integers, operations, elements, components and/or combinations thereof.

It should be understood that the terms "first", "second" and the like may be used herein to describe various elements, but those elements are not limited by those terms. Those terms are merely used for distinguishing one element from the other element. Therefore, without departing from the teaching of the present disclosure, a first element, a first component, or a first module described below can also be called a second element, a second component, or a second module.

Unless otherwise defined, all terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related technology and the background of the present disclosure, and should not be interpreted in an idealized or overly formal sense unless expressly so defined herein.

With the development of the microservices and the container technology, the user splits the application into the plurality of microservices when developing the large applications, the microservices are orchestrated, scheduled and managed by the corresponding deployment platform, and one configuration file is used for managing the application when the microservices are orchestrated, scheduled and managed. In the edge computing scenario, most devices at the edge side are the heterogeneous devices, the computing capabilities and the storage capabilities of different devices may vary greatly, and the structures of the Central Processing Units (CPUs) also vary, with the result that the configuration parameters of the same application for the different hardware types are different. For example, home gateway boxes or optical modems are sensitive to power consumption and generally adopt hardware with Advanced RISC Machine (ARM) architecture; and industrial gateways and industrial robots need a relatively high computing or storage capability and generally adopt hardware with x86 architecture. When running on the above two types of CPU structures, an application needs different configuration parameters. However, at present, management of all applications on devices at the edge side is uniformly deployed by a cloud side, and existing configuration files cannot specify that the applications are respectively deployed on a plurality of types of hardware.

In addition, an external capability provided by an application is related to a hardware type, and the external capabilities provided by the application when deployed on devices of different hardware types vary, but a cluster cannot adaptively choose to deploy the application on a certain type of hardware according to a desired external capability, and cannot adapt to a scenario where hardware of a plurality of types is used in the cluster for application deployment.

An application deployment method, an application blueprint generation method, a microservice platform, a communication terminal and a computer-readable medium provided by the present disclosure can be configured to adaptively choose to deploy an application instance on a hardware device of a corresponding hardware type according to a desired external capability, and can also adapt to a scenario where hardware devices of a plurality of types are used in a cluster for application deployment.

The application deployment method is applicable to application deployment for the microservice platform, i.e., a Platform as a Service (PaaS) platform, such as the Cloudify platform and the Kubernetes platform (K8S platform); the application blueprint generation method is applicable to generation of an application blueprint by the communication terminal; and the communication terminal includes a mobile terminal, a Personal Computer (PC), a tablet device and other devices capable of being used as clients.

FIG. 1 is a flowchart illustrating an application deployment method according to an embodiment of the present disclosure. As shown in FIG. 1, the method may include operations S1 and S2.

In operation S1, an application blueprint is received.

The application blueprint includes at least two different sub-blueprints, each recording a corresponding hardware type, an external capability provided by deploying one application instance on a hardware device of the hardware type, and a total external capability of an application.

Illustratively, the external capability is a capability of the application or the application instance to provide a service for an external object, may include a computing capability, a storage capability, a network capability, etc., and corresponds to resources provided by the hardware device, that is, the hardware device provides deployment resources for the application or the application instance, and the application or the application instance provides the external object (a user or a client) with the service such as a computing service, a storage service or a network service, and the external capability may be obtained by performing abstract evaluation on a comprehensive capability of the application or the application instance to provide the above services; in some embodiments, the total external capability of the application may correspond to the field "total_capability", and the external capability provided by deploying one application instance may correspond to the field "inst_capability"; the hardware types may include ARM architecture, x86 architecture, RISC-V architecture, Snow Ridge architecture, Denverton architecture, etc., and each single sub-blueprint corresponds to a single hardware type; and in some embodiments, the hardware types may also be referred to as sub-blueprint types and correspond to the field "version_type".

In some embodiments, the application blueprint may include file formats such as a blueprint (blueprint) and a configuration file (manifest) which are configured to orchestrate, schedule, or manage the application or the application instance, and the configuration file may include Deployment, Replica Set (RS), and Replication Controller (RC).

In some embodiments, the total external capability of the application may be recorded in the application blueprint.

In some embodiments, the application blueprint further includes a blueprint identifier configured to indicate that the application blueprint is a multi-version blueprint and may correspond to the field "Multiblueprint". The multi-version blueprint is a blueprint including at least two sub-blueprints.

In operation S2, an application instance is deployed on a hardware device in a cluster according to the application blueprint and external capabilities provided by all deployed application instances.

In the operation S2, the application instance is deployed on the hardware device in the cluster according to the application blueprint and the external capabilities provided by all the deployed application instances, and a requirement needs to be met that a sum of the external capabilities provided by all the deployed application instances is greater than or equal to the total external capability of the application, that is, the application instances are deployed on the hardware devices of the corresponding hardware types in the cluster according to the sub-blueprints in such a way that it is ensured that the deployed application meets a requirement of the total external capability of the application. Illustratively, a microservice platform, i.e., the cloud, may perform deployment of the application instances according to the sub-blueprints and a preset deployment rule, or according to the sub-blueprints and a deployment rule which is selected by the microservice platform itself according to a specific deployment requirement of the application.

In some embodiments, the sub-blueprints further record deployment priority levels; the operation S2 of deploying the application instance on the hardware device in the cluster according to the application blueprint and the external capabilities provided by all the deployed application instances may include: determining a sub-blueprint to be used for deployment according to the deployment priority levels, and deploying the application instance on the hardware device in the cluster according to the determined sub-blueprint to be used for deployment.

The application deployment method provided by the embodiments of the present disclosure can be used for adaptively deploying the application instance on the hardware device of the corresponding hardware type according to the total external capability of the application and the sub-blueprints recording the hardware types and the external capability provided by deploying one application instance.

Figure 2:
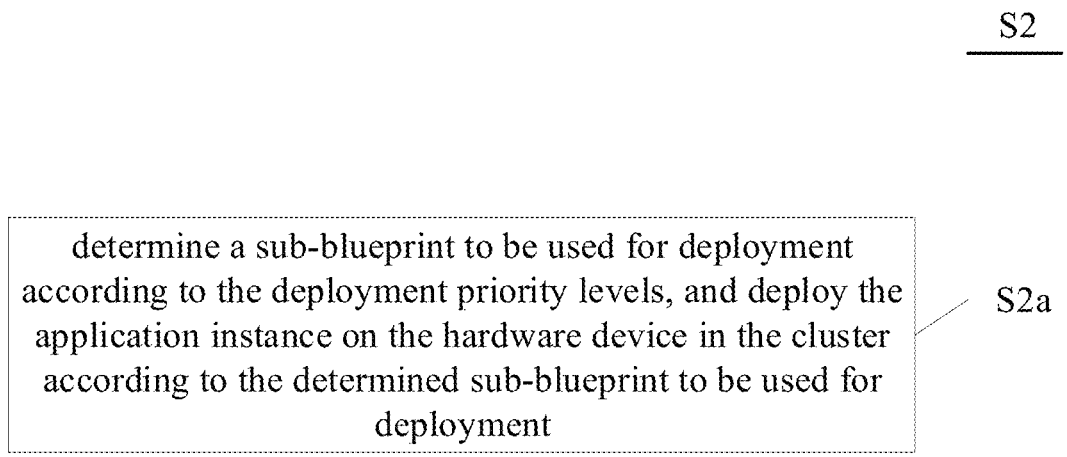
FIG. 2 is a flowchart illustrating an exemplary implementation of operation S2 according to an embodiment of the present disclosure.

FIG. 2 is a flowchart illustrating an exemplary implementation of the operation S2 according to an embodiment of the present disclosure. Illustratively, the sub-blueprints further record the deployment priority levels; and as shown in FIG. 2, the operation S2 of deploying the application instance on the hardware device in the cluster according to the application blueprint and the external capabilities provided by all the deployed application instances may include: operation S2a, determining a sub-blueprint to be used for deployment according to the deployment priority levels, and deploying the application instance on the hardware device in the cluster according to the determined sub-blueprint to be used for deployment.

FIG. 3 is a flowchart illustrating an exemplary implementation of the operation S2a according to an embodiment of the present disclosure. Illustratively, the operation S2a of determining the sub-blueprint to be used for deployment according to the deployment priority levels, and deploying the application instance on the hardware device in the cluster according to the determined sub-blueprint to be used for deployment may include operations S201 to S205.

In operation S201, the sub-blueprint with the highest deployment priority level of the application blueprint is determined as the sub-blueprint to be used for deployment.

In some embodiments, the deployment priority levels may be obtained according to selection by a user or selection by the cloud, and may correspond to the field "priority".

In operation S202, the maximum number of application instances that are allowed to be deployed according to remaining resources of a hardware device of the hardware type corresponding to the sub-blueprint to be used for deployment is determined, and it is determined whether a sum of external capabilities provided by deploying the maximum number of application instances is greater than or equal to a first capability to be supplemented.

The first capability to be supplemented is equal to a difference between the total external capability of the application and a sum of external capabilities of deployed application instances. In a case where the sub-blueprint to be used for deployment is the sub-blueprint with the highest deployment priority level, the first capability to be supplemented is equal to the total external capability of the application.

In the operation S202, if it is determined that the sum of the external capabilities provided by deploying the maximum number of application instances is greater than or equal to the first capability to be supplemented, operation S203 is performed; and if it is determined that the sum of the external capabilities provided by deploying the maximum number of application instances is less than the first capability to be supplemented, operations S204 and S205 are performed.

In operation S203, the application instance is deployed on the hardware device of the corresponding hardware type according to the sub-blueprint to be used for deployment in such a way that the sum of the external capabilities of the deployed application instances is greater than or equal to the first capability to be supplemented.

When the external capabilities of the deployed application instances is greater than or equal to the first capability to be supplemented, the deployment is completed and the deployed application meets the requirement of the total external capability of the application in two manners: just meeting the requirement and abundantly meeting the requirement.

In some embodiments, in the operation S203, the number of the deployed application instances is N satisfying: $N*p \geq Q$ and $(N-1)*p < Q$; where p represents the external capability provided by deploying one application instance on the hardware device of the corresponding hardware type according to the sub-blueprint to be used for deployment, and Q represents the first capability to be supplemented; and when the above conditions are satisfied, the deployed application meets the requirement of the total external capability of the application in the manner of just meeting the requirement on some level.

In operation S204, the maximum number of application instances are deployed on the hardware device of the corresponding hardware type according to the sub-blueprint to be used for deployment.

In the operation S204, after the maximum number of application instances are deployed, the requirement of the total external capability of the application is still not met.

In operation S205, the sub-blueprint with the deployment priority level lower than that of the sub-blueprint to be used for deployment by one level is selected as a new sub-blueprint to be used for deployment.

In the operation S205, the sub-blueprint with the deployment priority level lower than that of the current sub-blueprint to be used for deployment by one level is selected as the new sub-blueprint to be used for deployment, and the new sub-blueprint to be used for deployment is subjected to the operation S202 of determining the maximum number of application instances that are allowed to be deployed according to the remaining resources of the hardware device of the hardware type corresponding to the sub-blueprint to be used for deployment, so as to perform cyclic deployment.

In some embodiments, the deployment processes performed in the operation S2 and the operations related thereto may not be physical deployment processes, but may be embodied as deployment calculation for pre-deployment.

The application deployment method provided by the embodiments of the present disclosure can be used for selecting a specified hardware type according to the deployment priority levels to deploy the application instances, and can meet the corresponding requirement of the total external capability of the application while ensuring reasonable utilization of the deployment resources.

Figure 4:
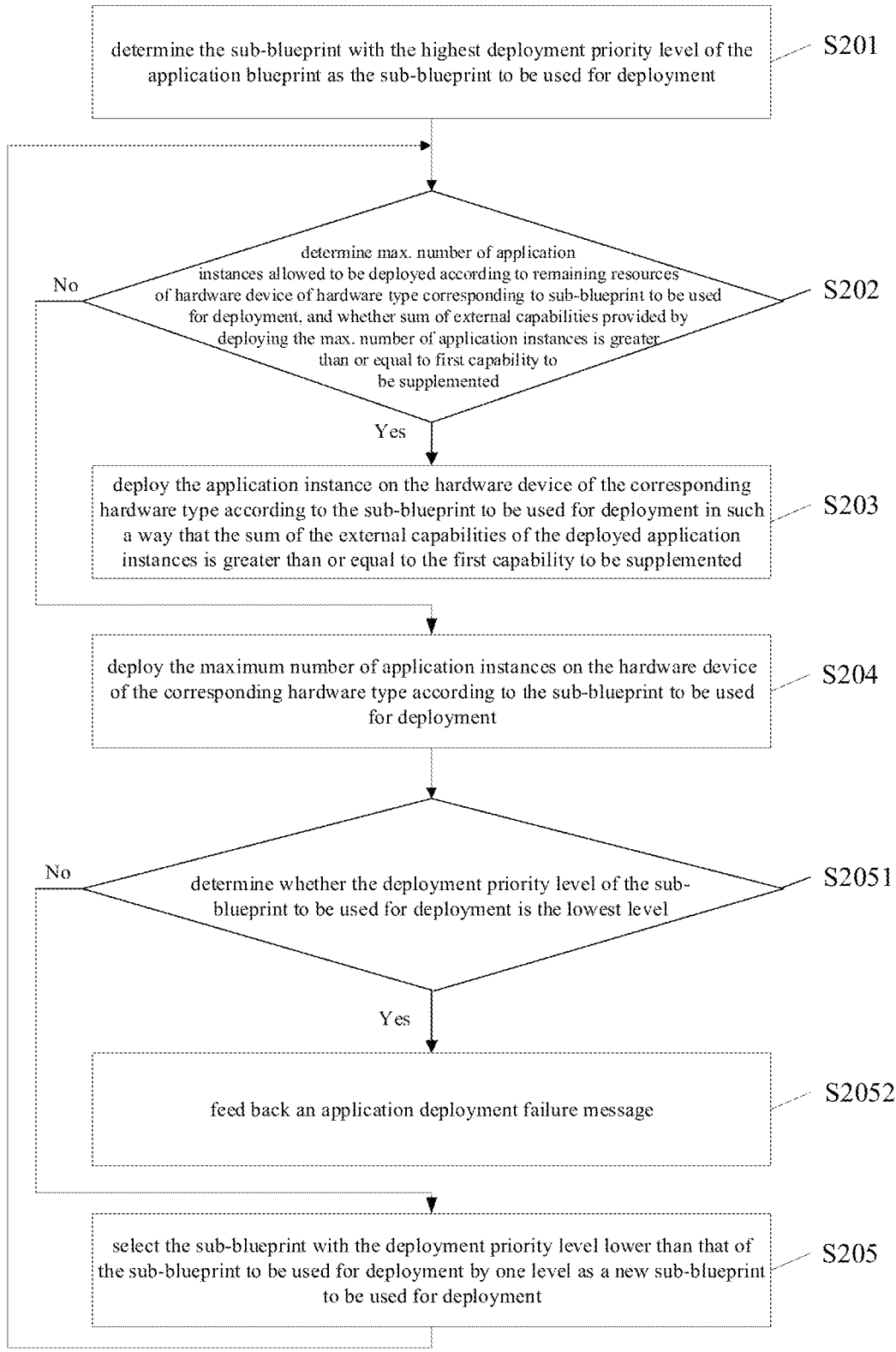
FIG. 4 is a flowchart illustrating another exemplary implementation of the operation S2a according to an embodiment of the present disclosure.

FIG. 4 is a flowchart illustrating another exemplary implementation of the operation S2a according to an embodiment of the present disclosure. The implementation is an exemplary implementation based on the method illustrated by FIG. 3. Illustratively, before the operation S205 of selecting the sub-blueprint with the deployment priority level lower than that of the sub-blueprint to be used for deployment by one level as the new sub-blueprint to be used for deployment, the method further includes operations S2051 and S2052.

In operation S2051, it is determined whether the deployment priority level of the sub-blueprint to be used for deployment is the lowest level.

In the operation S2051, if it is determined that the deployment priority level of the sub-blueprint to be used for deployment is the lowest level, the operation S2052 is performed; and it is determined that the deployment priority level of the sub-blueprint to be used for deployment is not the lowest level, the operation S205 is performed to select the sub-blueprint with the deployment priority level lower than that of the sub-blueprint to be used for deployment by one level as the new sub-blueprint to be used for deployment.

In operation S2052, an application deployment failure message is fed back.

Figure 5:
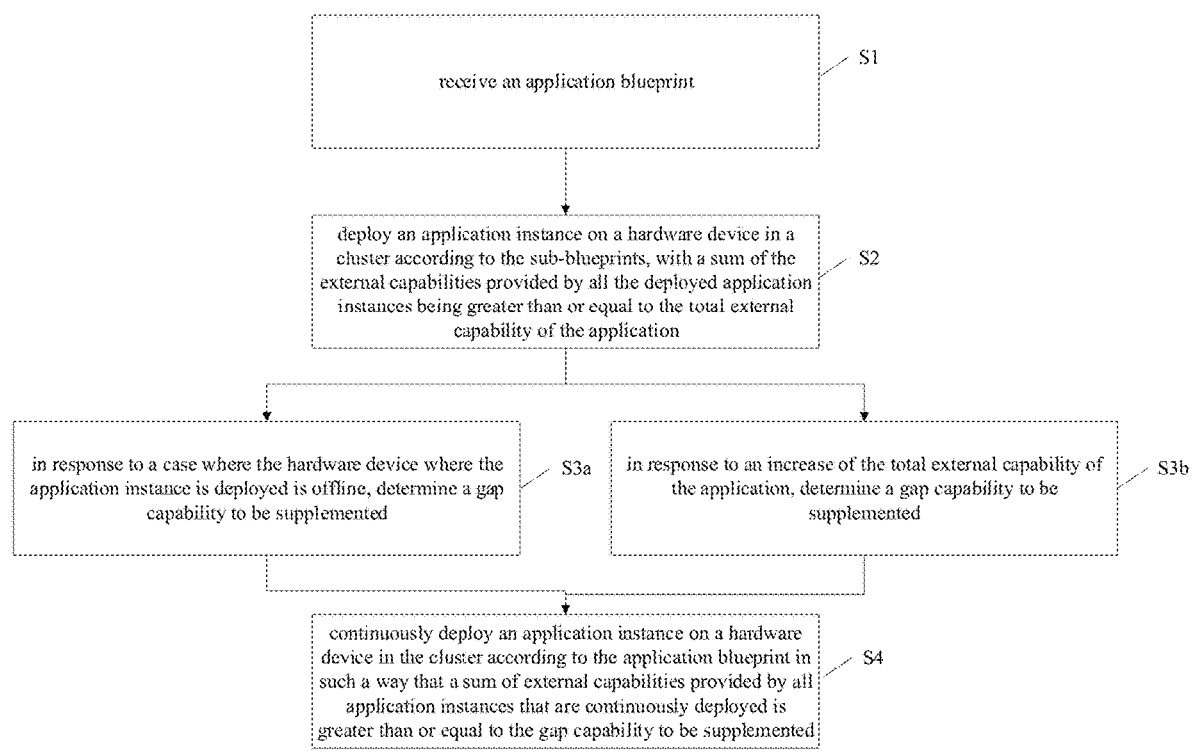
FIG. 5 is another flowchart illustrating the application deployment method according to an embodiment of the present disclosure.

FIG. 5 is another flowchart illustrating the application deployment method according to an embodiment of the present disclosure. As shown in FIG. 5, the method is an exemplary implementation based on the method illustrated by FIG. 1. Illustratively, the application deployment method further includes operations S3a, S3b, and S4.

In operation S3a, in response to a case where the hardware device where the application instance is deployed is offline, a gap capability to be supplemented is determined.

The gap capability to be supplemented is equal to a difference between the total external capability of the application and a sum of external capabilities of application instances which are deployed and operate normally, or may be referred to as a first gap capability to be supplemented.

In some embodiments, in response to a case where the whole hardware device corresponding to the hardware type for which the application instance is deployed is offline, the gap capability to be supplemented is determined, and the application instance is continuously deployed according to other sub-blueprints except for the sub-blueprint corresponding to the hardware type.

In some embodiments, in response to a new sub-blueprint sent by a user terminal, the new sub-blueprint is added to the application blueprint according to a blueprint identifier of the new sub-blueprint, and deployment of an application instance may be performed later according to the new sub-blueprint. That is, for deploying the application on a hardware device corresponding to a new hardware type, merely one new sub-blueprint needs to be added to the application blueprint.

In operation S3b, in response to an increase of the total external capability of the application, a gap capability to be supplemented is determined.

The gap capability to be supplemented is equal to an increment of the total external capability of the application, or may be referred to as a second gap capability to be supplemented. Illustratively, the application blueprint may be updated via an update interface of the cluster when the total external capability of the application is changed (increased or decreased).

In some embodiments, in response to a decrease of the total external capability of the application, a capability to be reclaimed is determined, an application instance is reclaimed from a hardware device in the cluster according to the sub-blueprints, a sum of external capabilities provided by all reclaimed application instances is less than or equal to the capability to be reclaimed which is equal to a decrement of the total external capability of the application.

In operation S4, an application instance is continuously deployed on a hardware device in the cluster according to the application blueprint in such a way that a sum of external capabilities provided by all application instances that are continuously deployed is greater than or equal to the gap capability to be supplemented.

Unlike "deployed" in the operation S2 and the operations related thereto, "continuously deployed" is for a condition where the gap capability to the supplemented exists; the gap capability to the supplemented may exist when "deployed" is being carried out, in which case "deployed" and "continuously deployed" may be carried out simultaneously; "deployed" and "continuously deployed" are just different in terms of expression and position in a process and are similar operations in practical applications, and both related implementation means and criteria used in "deployed" may be applied to "continuously deployed".

In some embodiments, the continued deployment processes performed in the operation S4 and the operations thereto may not be physical deployment processes, but may be embodied as deployment calculation for pre-deployment.

Figure 6:
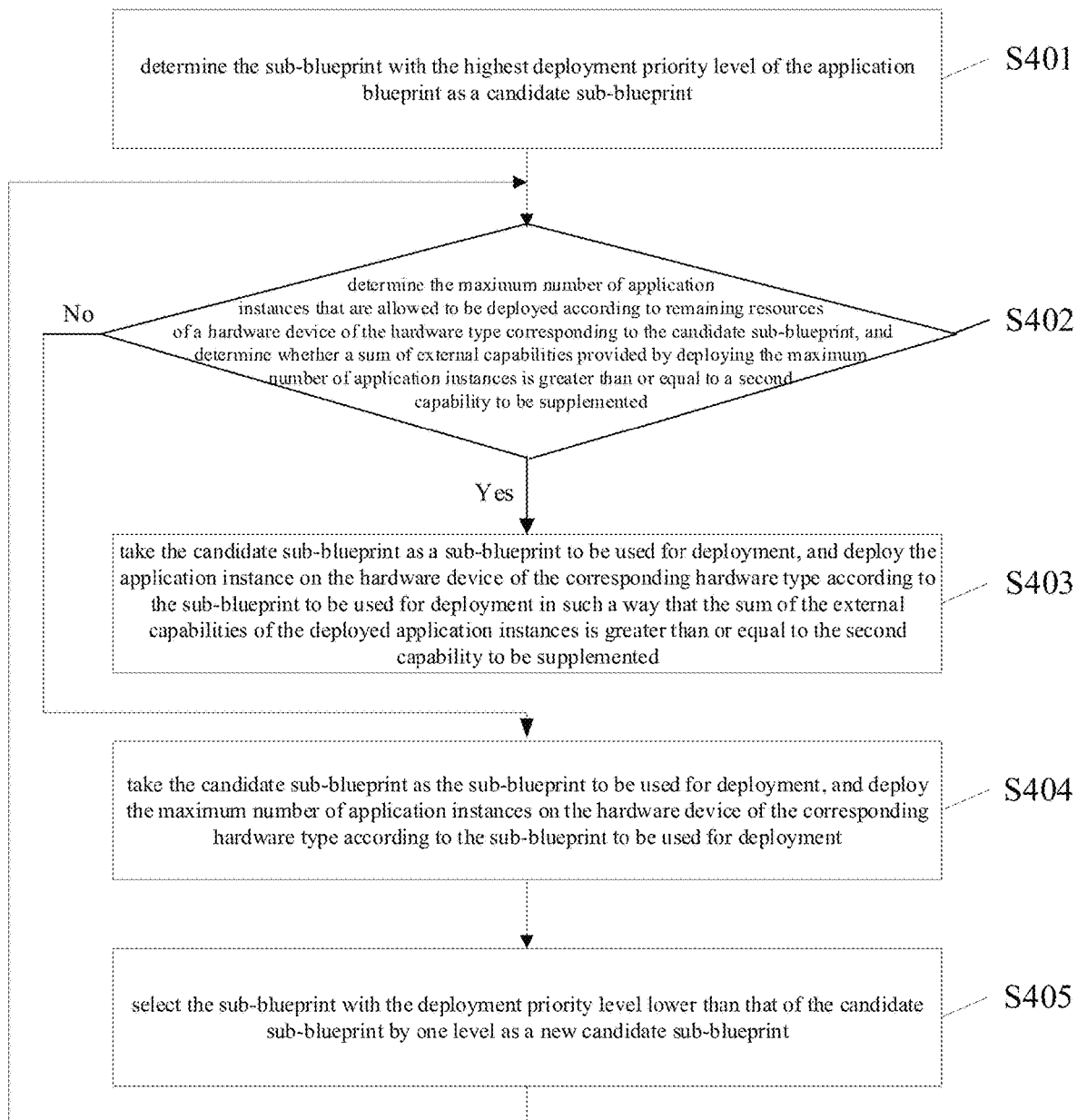
FIG. 6 is a flowchart illustrating an exemplary implementation of operation S4 according to an embodiment of the present disclosure.

FIG. 6 is a flowchart illustrating an exemplary implementation of the operation S4 according to an embodiment of the present disclosure. Illustratively, the sub-blueprints further record deployment priority levels; and as shown in FIG. 5, the operation S4 of continuously deploying the application instance on the hardware device in the cluster according to the application blueprint in such a way that the sum of the external capabilities provided by all the application instances that are continuously deployed is greater than or equal to the gap capability to be supplemented may include operations S401 to S405.

In operation S401, the sub-blueprint with the highest deployment priority level of the application blueprint is determined as a candidate sub-blueprint.

In operation S402, the maximum number of application instances that are allowed to be deployed according to remaining resources of a hardware device of the hardware type corresponding to the candidate sub-blueprint is determined, and it is determined whether a sum of external capabilities provided by deploying the maximum number of application instances is greater than or equal to a second capability to be supplemented.

The second capability to be supplemented is equal to a difference between the gap capability to be supplemented and the sum of the external capabilities of the application instances which are continuously deployed.

In the operation S402, if it is determined that the sum of the external capabilities provided by deploying the maximum number of application instances is greater than or equal to the second capability to be supplemented, operation S403 is performed; and if it is determined that the sum of the external capabilities provided by deploying the maximum number of application instances is less than the second capability to be supplemented, operations S404 and S405 are performed.

In operation S403, the candidate sub-blueprint is taken as a sub-blueprint to be used for deployment, and the application instance is deployed on the hardware device of the corresponding hardware type according to the sub-blueprint to be used for deployment in such a way that the sum of the external capabilities of the deployed application instances is greater than or equal to the second capability to be supplemented.

In operation S404, the candidate sub-blueprint is taken as the sub-blueprint to be used for deployment, and the maximum number of application instances are deployed on the hardware device of the corresponding hardware type according to the sub-blueprint to be used for deployment.

In operation S405, the sub-blueprint with the deployment priority level lower than that of the candidate sub-blueprint by one level is selected as a new candidate sub-blueprint.

In the operation S405, the sub-blueprint with the deployment priority level lower than that of the candidate sub-blueprint by one level is selected as the new candidate sub-blueprint, and the new candidate sub-blueprint is subjected to the operation S402 of determining the maximum number of application instances that are allowed to be deployed according to the remaining resources of the hardware device of the hardware type corresponding to the candidate sub-blueprint, so as to perform cyclic deployment.

Reference may be made to the operations S201 to S2052 for specific processes of the operations S401 to S405.

The application deployment method provided by the embodiments of the present disclosure can be used for adjusting an application instance which is deployed or being deployed accordingly in a case where some hardware devices are offline or the total external capability of the application is updated, thereby meeting a current deployment requirement.

Figure 7:
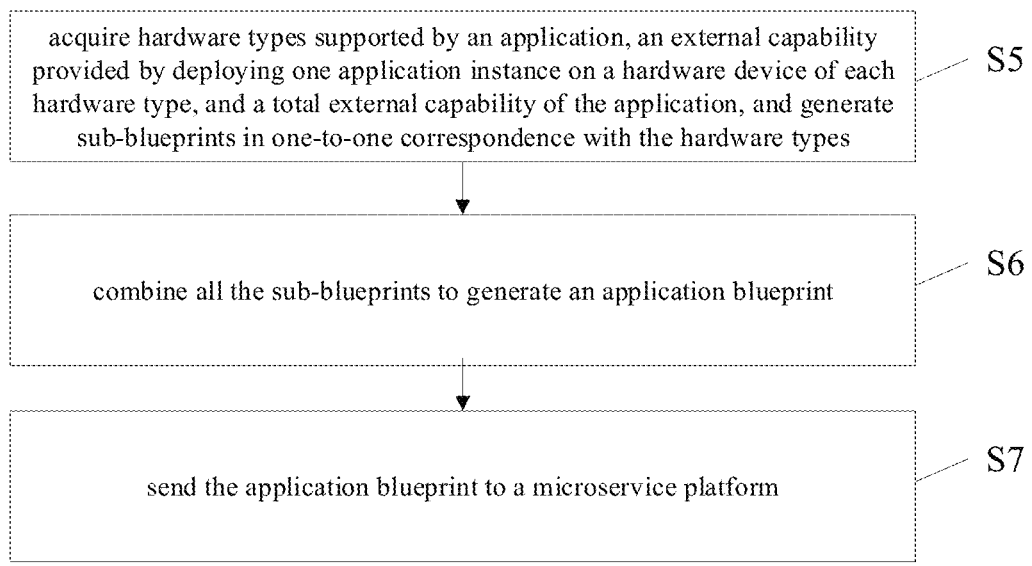
FIG. 7 is a flowchart illustrating an application blueprint generation method according to an embodiment of the present disclosure.

FIG. 7 is a flowchart illustrating an application blueprint generation method according to an embodiment of the present disclosure. As shown in FIG. 7, the method may include operations S5 to S7.

In operation S5, hardware types supported by an application, an external capability provided by deploying one application instance on a hardware device of each hardware type, and a total external capability of the application are acquired, and sub-blueprints in one-to-one correspondence with the hardware types are generated.

Each sub-blueprint records a corresponding hardware type, and the external capability provided by deploying one application instance on the hardware device of the hardware type.

In operation S6, all the sub-blueprints are combined to generate an application blueprint.

The application blueprint includes the total external capability of the application and at least two different sub-blueprints; and in some embodiments, a field corresponding to the total external capability of the application may also be recorded in the sub-blueprints, and each sub-blueprint records the same total external capability of the application.

In some embodiments, the application blueprint further includes a blueprint identifier configured to indicate that the application blueprint is a multi-version blueprint, which is a blueprint including at least two sub-blueprints.

In operation S7, the application blueprint is sent to a microservice platform.

In the operation S7, the application blueprint is sent to the microservice platform for the microservice platform to deploy application instances on hardware devices in a cluster according to the application blueprint.

The application blueprint generation method provided by the embodiments of the present disclosure can be used for generating the application blueprint including a plurality of sub-blueprints according to the hardware types supported by the application, the external capability provided by deploying one application instance and the total external capability of the application, so that the hardware device of the corresponding hardware type may be selected according to a requirement of the capability of the application to perform deployment of the application instances.

The application deployment method provided by the present disclosure is described in detail below in conjunction with practical applications.

Figure 8A:
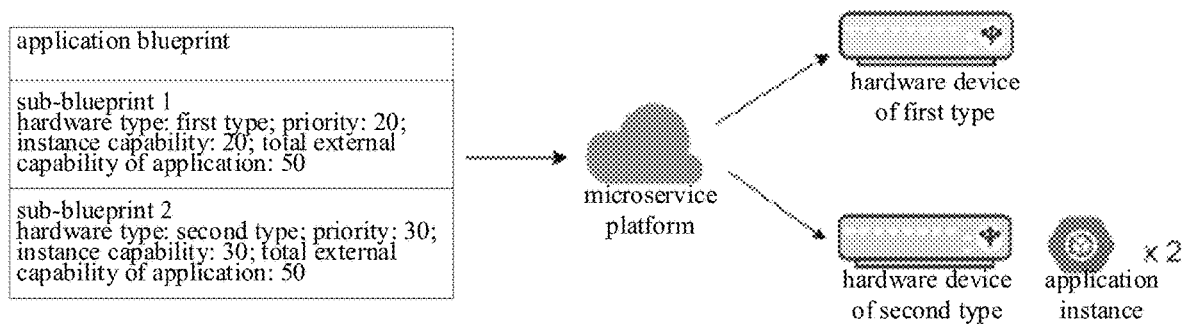
FIG. 8A is another flowchart illustrating the application deployment method according to an embodiment of the present disclosure.

FIG. 8A is another flowchart illustrating the application deployment method according to an embodiment of the present disclosure. Illustratively, the application deployment method is applied to the microservice platform (the PaaS platform), a packet structure of the application blueprint takes the RC as a template and corresponds to the field "ReplicationController", and the application blueprint includes the total external capability of the application, two different sub-blueprints (sub-blueprint 1 and sub-blueprint 2), and the blueprint identifier corresponding to the field "MultiBluePrint". The total external capability of the application is recorded in each sub-blueprint and corresponds to the field "total_capability", each sub-blueprint further records the corresponding hardware type, the external capability provided by deploying one application instance on the hardware device of the hardware type, and the deployment priority level, which corresponds to the fields "version_type", "inst_capability" and "priority", respectively, and the external capability provided by deploying one application instance on the hardware device of the hardware type is the instance capability. A cluster of hardware devices corresponding to the microservice platform includes a plurality of hardware devices of two types corresponding to the hardware types recorded in the two sub-blueprints, the hardware devices of the first type have the denverton architecture, and the hardware devices of the second type have the snowridge architecture.

After receiving the application blueprint, the microservice platform determines that the application blueprint is the multi-version blueprint according to the blueprint identifier, and obtains the two sub-blueprints through analysis; the sub-blueprint which corresponds to the hardware type of snowridge is taken as the sub-blueprint to be used for deployment according to the deployment priority levels, and the number of replicas is calculated; and since one replica of the sub-blueprint corresponds to one application instance, according to the total external capability of the application total_capability=50 and a single snowridge-type application instance corresponding to inst_capability=30, the number of the replicas is 2 at this time, that is, two application instances need to be deployed for meeting the requirement that the sum of the external capabilities of the deployed application instances is larger than or equal to the first capability to be supplemented, which is 50 and is equal to the difference between the total external capability of the application and the sum of the external capabilities of the deployed application instances.

There are three cases at this time. As shown in FIG. 8A illustrating the first case, the maximum number of application instances that are allowed to be deployed according to the remaining resources of the hardware device of the snowridge type is greater than or equal to 2, so that two application instances can be directly deployed, with the requirement of the total external capability of the application being met.

Figure 8B:
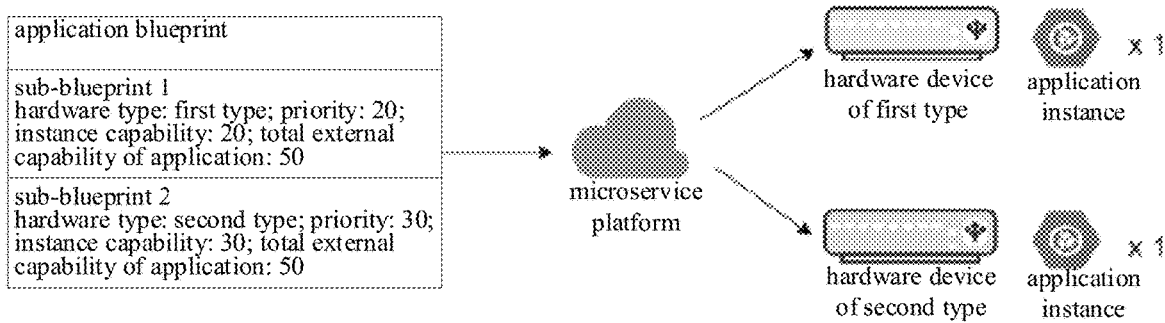
FIG. 8B is still another flowchart illustrating the application deployment method according to an embodiment of the present disclosure.

FIG. 8B is still another flowchart illustrating the application deployment method according to an embodiment of the present disclosure, and corresponds to the second case. As shown in FIG. 8B, the maximum number of application instances that are allowed to be deployed according to the remaining resources of the hardware device of the snowridge type is 1, so that one application instance can be deployed correspondingly. The sub-blueprint which corresponds to the hardware type of denverton is then taken as the sub-blueprint to be used for deployment, it is determined, according to a single denverton-type application instance corresponding to inst_capability=20, that one application instance needs to be deployed for meeting the requirement that the sum of the external capabilities of the deployed application instances is greater than or equal to the first capability to be supplemented which is 20, and the maximum number of application instances that are allowed to be deployed according to the remaining resources of the hardware device of the denverton type is greater than or equal to 1, so that one application instance can be directly deployed, with the requirement of the total external capability of the application being met.

Figure 8C:
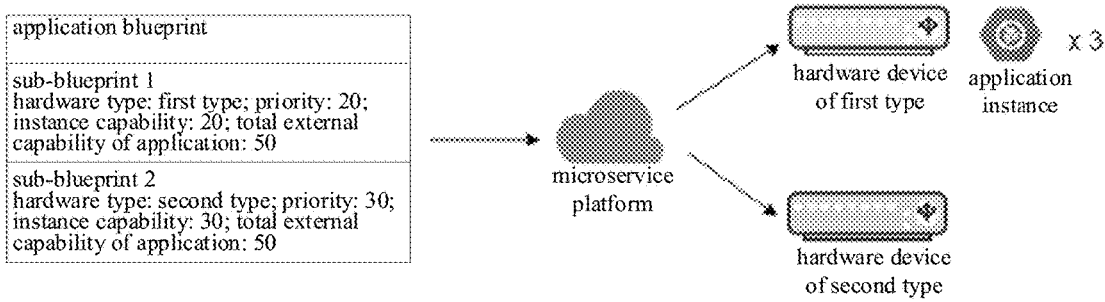
FIG. 8C is yet another flowchart illustrating the application deployment method according to an embodiment of the present disclosure.

FIG. 8C is yet another flowchart illustrating the application deployment method according to an embodiment of the present disclosure, and corresponds to the third case. As shown in FIG. 8C, when the maximum number of application instances that are allowed to be deployed according to the remaining resources of the hardware device of the snowridge type is 0, the sub-blueprint which corresponds to the hardware type of denverton is taken as the sub-blueprint to be used for deployment, and it is determined, according to the single denverton-type application instance corresponding to inst_capability=20, that three application instances need to be deployed for meeting the requirement that the sum of the external capabilities of the deployed application instances is greater than or equal to the first capability to be supplemented which is 50. The maximum number of application instances that are allowed to be deployed according to the remaining resources of the hardware device of the denverton type is greater than or equal to 3, so that three application instances can be directly deployed, with the requirement of the total external capability of the application being met.

Figure 8D:
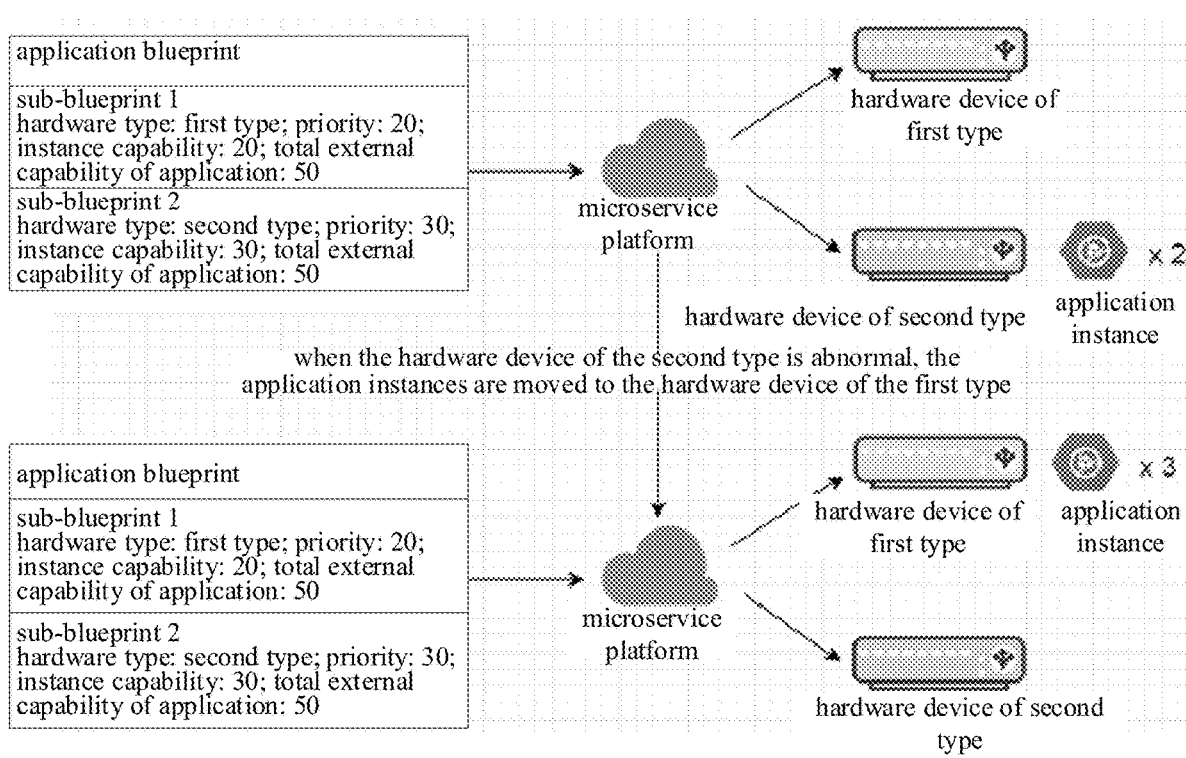
FIG. 8D is yet another flowchart illustrating the application deployment method according to an embodiment of the present disclosure.

FIG. 8D is yet another flowchart illustrating the application deployment method according to an embodiment of the present disclosure and illustrates the first case described with reference to FIG. 8A. As shown in FIG. 8D, in response to a case where the whole hardware device of the snowridge type where the application instances are deployed is offline, two application instances deployed on the hardware device of the snowridge type are also offline. The gap capability to be supplemented is determined: the gap capability to be supplemented is 50 and is equal to the difference between the total external capability of the application and the sum of the external capabilities of the application instances which are deployed and operate normally. The application instances are continuously deployed according to the sub-blueprint except for the sub-blueprint corresponding to the hardware type of snowridge, i.e., the sub-blueprint corresponding to the denverton type, that is, the hardware device of the snowridge type is abnormal, so that the application instances are moved to the hardware device of the denverton type. In some embodiments, when there are more than two sub-blueprints, the sub-blueprint to be used for deployment is determined according to the deployment priority levels.

The sub-blueprint corresponding to the hardware type of denverton is taken as the sub-blueprint to be used for deployment, and it is determined, according to the single denverton-type application instance corresponding to inst_capability=20, that three application instances need to be deployed for meeting the requirement that the sum of the external capabilities of the deployed application instances is greater than or equal to the second capability to be supplemented, which is 50 and is equal to the difference between the gap capability to be supplemented and the sum of the external capabilities of the application instances which are continuously deployed. The maximum number of application instances that are allowed to be deployed according to the remaining resources of the hardware device of the denverton type is greater than or equal to 3, so that three application instances can be directly deployed, with the requirement of the total external capability of the application being met.

Figure 9A:
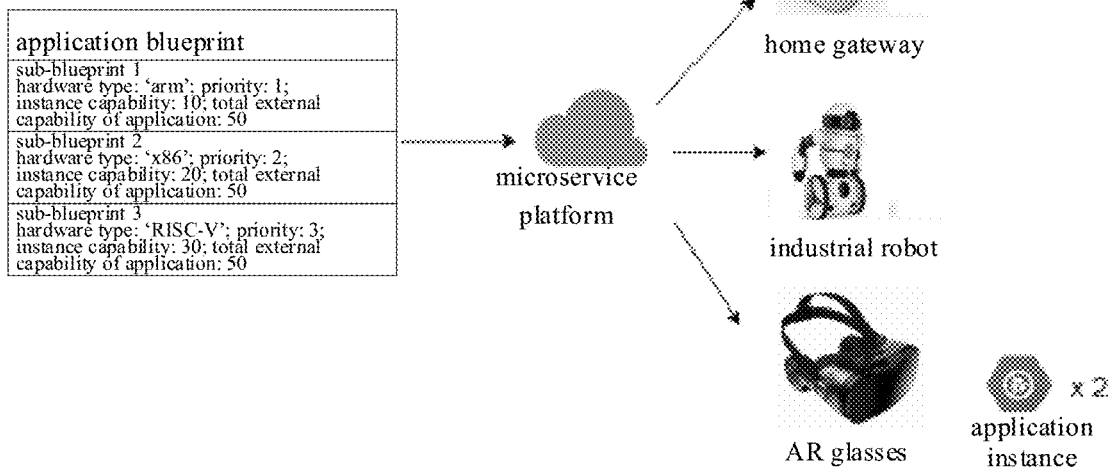
FIG. 9A is yet another flowchart illustrating the application deployment method according to an embodiment of the present disclosure.

FIG. 9A is yet another flowchart illustrating the application deployment method according to an embodiment of the present disclosure. Illustratively, corresponding to hardware types recorded in three sub-blueprints (sub-blueprint 1, sub-blueprint 2, and sub-blueprint 3) of the application blueprint, a cluster of hardware devices corresponding to the microservice platform includes a home gateway with a CPU having the ARM architecture, an industrial robot with a CPU having the x86 architecture, and AR glasses with a CPU having the RISC-V architecture.

There are a plurality of cases at this time. As shown in FIG. 9A illustrating the first case, according to the total external capability of the application, the external capability provided by deploying one application instance on the hardware device of the corresponding hardware type, and the deployment priority levels set by a user side, two application instances are deployed on the AR glasses according to the processes similar to those provided by the above embodiments, so as to meet the requirement of the total external capability of the application.

Figure 9B:
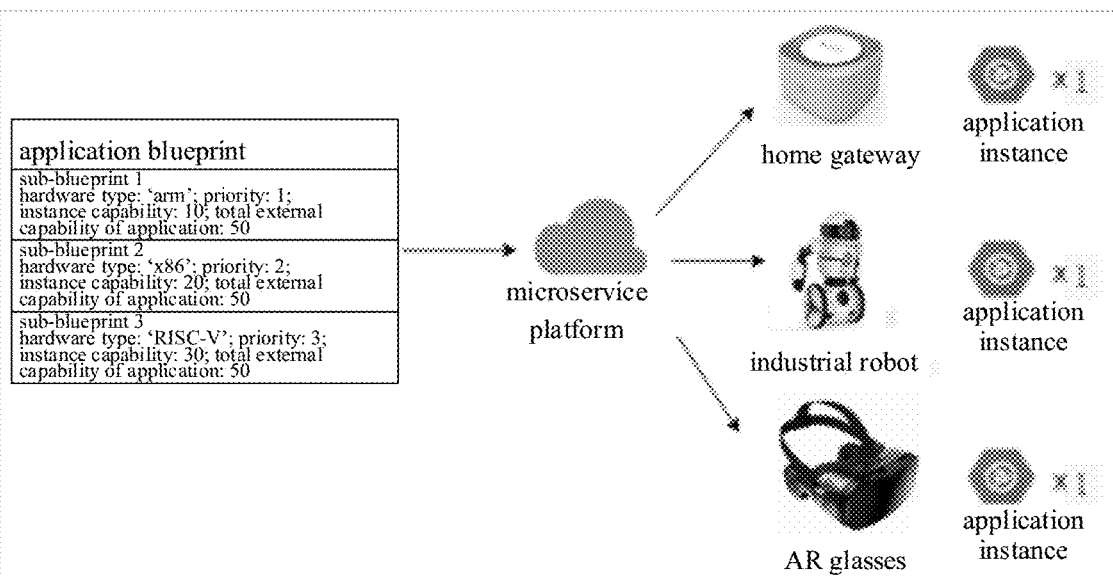
FIG. 9B is yet another flowchart illustrating the application deployment method according to an embodiment of the present disclosure.

FIG. 9B is yet another flowchart illustrating the application deployment method according to an embodiment of the present disclosure, and corresponds to the second case. As shown in FIG. 9B, when a cloud side learns that the application has a deployment requirement on each of the three hardware devices according to an actual situation, the cloud side deploys one application instance on each of the home gateway, the industrial robot, and the AR glasses on the premise that the sum of the provided external capabilities is greater than or equal to the total external capability of the application even if the remaining resources of the AR glasses are enough to meet the requirement of the total external capability of the application. Although the requirement of the total external capability of the application can still be met if the application instance deployed on the home gateway is reclaimed, the cloud side adaptively selects the hardware types and deploys the application instances according to the requirement of the application, and allows for resource redundancy.

An embodiment of the present disclosure provides a microservice platform, including: one or more processors; and a storage device configured to store one or more programs. When executed by the one or more processors, the one or more programs cause the one or more processors to carry out the application deployment method according to any of the above embodiments.

An embodiment of the present disclosure provides a computer-readable medium having a computer program stored thereon. When the program is executed by a processor, the operations of the application deployment method according to any of the above embodiments are performed.

An embodiment of the present disclosure provides a communication terminal, including: one or more processors; and a storage device configured to store one or more programs. When executed by the one or more processors, the one or more programs cause the one or more processors to carry out the application blueprint generation method according to the above embodiments.

An embodiment of the present disclosure provides a computer-readable medium having a computer program stored thereon. When the program is executed by a processor, the operations of the application blueprint generation method according to the above embodiments are performed.

The embodiments of the present disclosure provide the application deployment method, the application blueprint generation method, the microservice platform, the communication terminal and the computer-readable media. The present disclosure has the following beneficial effects: the application deployment method can be applied to the microservice platform to achieve the deployment of the application on the hardware devices of the hardware types corresponding to the sub-blueprints by considering the total external capability of the application together with the sub-blueprints of the application blueprint; since the sub-blueprints are in one-to-one correspondence with the hardware types and record the information related to the external capability of the application, the cluster can adaptively choose to deploy the application on the hardware of a specified type according to the desired external capability, and perform the deployment of the application through mixed use of the plurality of types of hardware in the cluster according to the deployment condition of the application; and the application blueprint generation method can be applied to the communication terminal to achieve the generation of the application blueprint by adding the total external capability of the application to the application blueprint and combining the plurality of sub-blueprints.

It should be understood by those of ordinary skill in the art that the functional modules/units in all or some of the operations and devices disclosed in the above method may be implemented as software, firmware, hardware, or suitable combinations thereof. If implemented as hardware, the division between the functional modules/units stated above is not necessarily corresponding to the division of physical components; and for example, one physical component may have a plurality of functions, or one function or operation may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, a Random Access Memory, a Read-Only Memory, an Electrically Erasable Programmable Read-Only Memory (EEPROM), a flash memory or other storage technology, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The present disclosure discloses exemplary embodiments using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular embodiment can be used alone or in combination with features, characteristics and/or elements described in connection with other embodiments. Therefore, it should be understood by those of ordinary skill in the art that various changes in the forms and the details can be made without departing from the scope of the present disclosure of the appended claims.

What is claimed is:

1. An application deployment method, comprising:
   receiving an application blueprint comprising at least two sub-blueprints having different deployment priority levels, wherein each of the at least two sub-blueprints comprises a hardware type field for indicating a corresponding hardware type, an instance capability field for indicating an external capability provided by deploying one application instance on a hardware device of the corresponding hardware type and a total external capability field for indicating a total external capability of an application; and
   deploying an application instance on a hardware device in a cluster according to the application blueprint and external capabilities provided by all deployed application instances, with a sum of the external capabilities provided by all the deployed application instances being greater than or equal to the total external capability of the application,
   wherein a plurality of application instances are repeatedly deployed according to one of the at least two sub-blueprints, or a plurality of application instances are deployed according to multiple sub-blueprints of the least two sub-blueprints, respectively.

2. The application deployment method of claim 1, wherein each of the at least two sub-blueprints further records a deployment priority level; and
   deploying the application instance on the hardware device in the cluster according to the application blueprint and the external capabilities provided by all the deployed application instances comprises:
   determining a sub-blueprint to be used for deployment according to the deployment priority level, and deploying the application instance on the hardware device in the cluster according to the determined sub-blueprint to be used for deployment.

3. The application deployment method of claim 2, wherein determining the sub-blueprint to be used for deployment according to the deployment priority level, and deploying the application instance on the hardware device in the cluster according to the determined sub-blueprint to be used for deployment comprises:

determining a sub-blueprint with a highest deployment priority level of the application blueprint as the sub-blueprint to be used for deployment;

determining a maximum number of application instances that are allowed to be deployed according to remaining resources of a hardware device of a hardware type corresponding to the sub-blueprint to be used for deployment, and determining whether a sum of external capabilities provided by deploying the maximum number of application instances is greater than or equal to a first capability to be supplemented, wherein the first capability to be supplemented is equal to a difference obtained by subtracting a sum of external capabilities of deployed application instances from the total external capability of the application;

in response to determining that the sum of the external capabilities provided by deploying the maximum number of application instances is greater than or equal to the first capability to be supplemented, deploying the application instance on the hardware device of the corresponding hardware type according to the sub-blueprint to be used for deployment in such a way that the sum of the external capabilities of the deployed application instances is greater than or equal to the first capability to be supplemented; and in response to determining that the sum of the external capabilities provided by deploying the maximum number of application instances is less than the first capability to be supplemented, deploying the maximum number of application instances on the hardware device of the corresponding hardware type according to the sub-blueprint to be used for deployment; and selecting a sub-blueprint with a deployment priority level lower than the deployment priority level of the sub-blueprint to be used for deployment by one level as a new sub-blueprint to be used for deployment, and continuously performing the operation of determining the maximum number of application instances that are allowed to be deployed according to remaining resources of the hardware device of the hardware type corresponding to the sub-blueprint to be used for deployment.

4. The application deployment method of claim 3, wherein in the operation of deploying the application instance on the hardware device of the corresponding hardware type according to the sub-blueprint to be used for deployment in such a way that the sum of the external capabilities of the deployed application instances is greater than or equal to the first capability to be supplemented, the number of the deployed application instances is N satisfying: $N*p \geq Q$ and $(N-1)*p \leq Q$;

where p represents the external capability provided by deploying one application instance on the hardware device of the corresponding hardware type according to the sub-blueprint to be used for deployment, and Q represents the first capability to be supplemented.

5. The application deployment method of claim 3, before selecting the sub-blueprint with the deployment priority level lower than the deployment priority level lower of the sub-blueprint to be used for deployment by one level as the new sub-blueprint to be used for deployment, further comprising:

determining whether the deployment priority level of the sub-blueprint to be used for deployment is a lowest level;

in response to determining that the deployment priority level of the sub-blueprint to be used for deployment is the lowest level, feeding back an application deployment failure message; and in response to determining that the deployment priority level of the sub-blueprint to be used for deployment is not the lowest level, continuously performing the operation of selecting the sub-blueprint with the deployment priority level lower than the deployment priority level of the sub-blueprint to be used for deployment by one level as the new sub-blueprint to be used for deployment.

6. The application deployment method of claim 1, further comprising:

in response to a case where the hardware device where the application instance is deployed is offline, determining a gap capability to be supplemented, wherein the gap capability to be supplemented is equal to a difference between the total external capability of the application and a sum of external capabilities of application instances which are deployed and operate normally; and continuously deploying the application instance on a hardware device in the cluster according to the application blueprint in such a way that a sum of external capabilities provided by all application instances that are continuously deployed is greater than or equal to the gap capability to be supplemented.

7. The application deployment method of claim 1, further comprising:

in response to an increase of the total external capability of the application, determining a gap capability to be supplemented, wherein the gap capability to be supplemented is equal to an increment of the total external capability of the application; and continuously deploying an application instance on a hardware device in the cluster according to the application blueprint in such a way that a sum of external capabilities provided by all application instances that are continuously deployed is greater than or equal to the gap capability to be supplemented.

8. The application deployment method of claim 6, wherein each of the sub-blueprints further records a deployment priority level; and the operation of continuously deploying the application instance on the hardware device in the cluster according to the application blueprint in such a way that the sum of the external capabilities provided by all the application instances that are continuously deployed is greater than or equal to the gap capability to be supplemented comprises:

determining a sub-blueprint with a highest deployment priority level of the application blueprint as a candidate sub-blueprint;

determining a maximum number of application instances that are allowed to be deployed according to remaining resources of a hardware device of a hardware type corresponding to the candidate sub-blueprint, and determining whether a sum of external capabilities provided by deploying the maximum number of application instances is greater than or equal to a second capability to be supplemented, wherein the second capability to be supplemented is equal to a difference between the gap capability to be supplemented and the sum of the external capabilities of the application instances that are continuously deployed;

in response to determining that the sum of the external capabilities provided by deploying the maximum number of application instances is greater than or equal to the second capability to be supplemented, taking the candidate sub-blueprint as the sub-blueprint to be used for deployment, and deploying the application instance on the hardware device of the corresponding hardware type according to the sub-blueprint to be used for deployment in such a way that a sum of external capabilities of deployed application instances is greater than or equal to the second capability to be supplemented; and in response to determining that the sum of the external capabilities provided by deploying the maximum number of application instances is less than the second capability to be supplemented, taking the candidate sub-blueprint as the sub-blueprint to be used for deployment, and deploying the maximum number of application instances on the hardware device of the corresponding hardware type according to the sub-blueprint to be used for deployment; and selecting a sub-blueprint with a deployment priority level lower than the deployment priority level of the candidate sub-blueprint by one level as a new candidate sub-blueprint, and continuously performing the operation of determining the maximum number of application instances that are allowed to be deployed according to the remaining resources of the hardware device of the hardware type corresponding to the candidate sub-blueprint.

9. The application deployment method of claim 1, wherein the application blueprint further comprises: a blueprint identifier configured to indicate that the application blueprint comprises a plurality of sub-blueprints.

10. An application blueprint generation method, comprising:

acquiring hardware types supported by an application, an external capability provided by deploying one application instance on a hardware device of each hardware type, and a total external capability of the application, and generating sub-blueprints in one-to-one correspondence with the hardware types, wherein the sub-blueprints have different deployment priority levels, and each of the sub-blueprints comprises a hardware type field for indicating a corresponding hardware type, an instance capability field for indicating an external capability provided by deploying one application instance on a hardware device of the corresponding hardware type and a total external capability field for indicating the total external capability;

combining all the sub-blueprints to generate an application blueprint; and sending the application blueprint to a microservice platform for the microservice platform to deploy an application instance on a hardware device in a cluster according to the application blueprint, wherein a plurality of application instances are repeatedly deployed according to one of the sub-blueprints, or a plurality of application instances are deployed according to multiple sub-blueprints of the sub-blueprints, respectively.

11. A microservice platform, comprising:
one or more processors; and
a storage device configured to store one or more programs;
when executed by the one or more processors, the one or more programs cause the one or more processors to carry out the application deployment method of claim 1.

12. A communication terminal, comprising:
one or more processors; and
a storage device configured to store one or more programs;
when executed by the one or more processors, the one or more programs cause the one or more processors to carry out the application blueprint generation method of claim 10.

13. A non-transitory computer-readable medium having a computer program stored thereon, wherein, when the program is executed by a processor, the operations of the application deployment method of claim 1 are performed.

14. A non-transitory computer-readable medium having a computer program stored thereon, wherein, when the program is executed by a processor, the operations of the application blueprint generation method of claim 10 are performed.

15. The application deployment method of claim 7, wherein each of the sub-blueprints further records a deployment priority level; and the operation of continuously deploying the application instance on the hardware device in the cluster according to the application blueprint in such a way that the sum of the external capabilities provided by all the application instances that are continuously deployed is greater than or equal to the gap capability to be supplemented comprises:

determining a sub-blueprint with a highest deployment priority level of the application blueprint as a candidate sub-blueprint;

determining a maximum number of application instances that are allowed to be deployed according to remaining resources of a hardware device of a hardware type corresponding to the candidate sub-blueprint, and determining whether a sum of external capabilities provided by deploying the maximum number of application instances is greater than or equal to a second capability to be supplemented, wherein the second capability to be supplemented is equal to a difference between the gap capability to be supplemented and the sum of the external capabilities of the application instances that are continuously deployed;

in response to determining that the sum of the external capabilities provided by deploying the maximum number of application instances is greater than or equal to the second capability to be supplemented, taking the candidate sub-blueprint as the sub-blueprint to be used for deployment, and deploying the application instance on the hardware device of the corresponding hardware type according to the sub-blueprint to be used for deployment in such a way that a sum of external capabilities of deployed application instances is greater than or equal to the second capability to be supplemented; and in response to determining that the sum of the external capabilities provided by deploying the maximum number of application instances is less than the second capability to be supplemented, taking the candidate sub-blueprint as the sub-blueprint to be used for deployment, and deploying the maximum number of application instances on the hardware device of the corresponding hardware type according to the sub-blueprint to be used for deployment; and selecting a sub-blueprint with a deployment priority level lower than the deployment priority level of the candidate sub-blueprint by one level as a new candidate sub-blueprint, and continuously performing the operation of determining the maximum number of application instances that are allowed to be deployed according to the remaining resources of the hardware device of the hardware type corresponding to the candidate sub-blueprint.

16. The application deployment method of claim 2, wherein the application blueprint further comprises: a blueprint identifier configured to indicate that the application blueprint comprises a plurality of sub-blueprints.

17. The application deployment method of claim 3, wherein the application blueprint further comprises: a blueprint identifier configured to indicate that the application blueprint comprises a plurality of sub-blueprints.

18. The application deployment method of claim 4, wherein the application blueprint further comprises: a blueprint identifier configured to indicate that the application blueprint comprises a plurality of sub-blueprints.

19. The application deployment method of claim 5, wherein the application blueprint further comprises: a blueprint identifier configured to indicate that the application blueprint comprises a plurality of sub-blueprints.

20. The application deployment method of claim 6, wherein the application blueprint further comprises: a blueprint identifier configured to indicate that the application blueprint comprises a plurality of sub-blueprints.

* * * * *

UNITED STATES PATENT AND TRADEMARK OFFICE
CERTIFICATE OF CORRECTION

PATENT NO. : 12,260,201 B2
APPLICATION NO. : 18/009374
DATED : March 25, 2025
INVENTOR(S) : Zhanwei Xu et al.

It is certified that error appears in the above-identified patent and that said Letters Patent is hereby corrected as shown below:

In the Claims

Column 15, Line 60, the formula reading:
- $(N-1)*p \leq Q$ -
Should read:
-- $(N-1)* p < Q$ --

Signed and Sealed this
First Day of July, 2025

Coke Morgan Stewart
*Acting Director of the United States Patent and Trademark Office*